No. 823,451. PATENTED JUNE 12, 1906.
W. W. SWEENEY & F. A. SYLVA.
JOINT.
APPLICATION FILED FEB. 9, 1905.
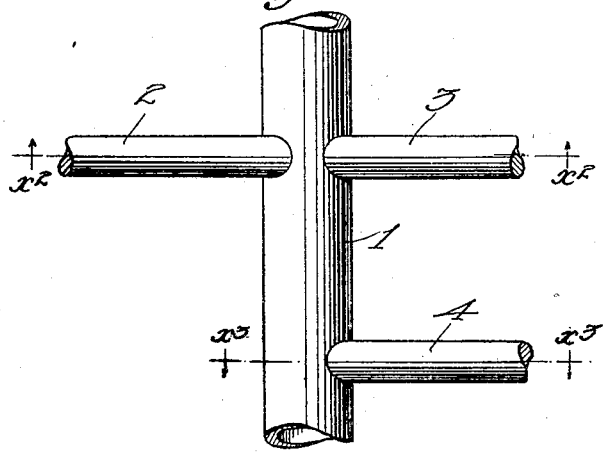
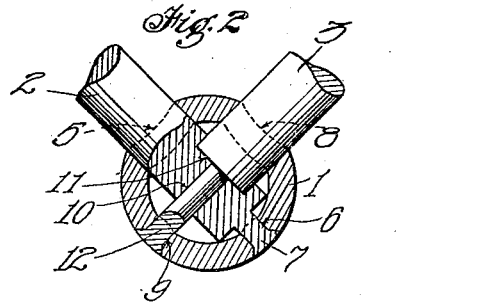
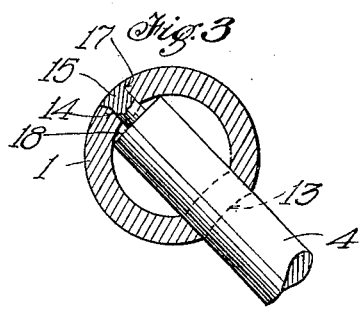
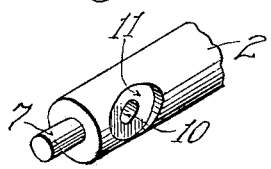
Witnesses
Inventors
William W. Sweeney
Frank A. Sylva
by Townsend Bros. attys.

UNITED STATES PATENT OFFICE.

WILLIAM W. SWEENEY AND FRANK A. SYLVA, OF LOS ANGELES, CALIFORNIA, ASSIGNORS, BY DIRECT AND MESNE ASSIGNMENTS, TO PACIFIC SURGICAL MANUFACTURING COMPANY, OF LOS ANGELES, CALIFORNIA, A CORPORATION OF CALIFORNIA.

JOINT.

No. 823,451.  Specification of Letters Patent.  Patented June 12, 1906.

Application filed February 9, 1905. Serial No. 244,865.

*To all whom it may concern:*

Be it known that we, WILLIAM W. SWEENEY and FRANK A. SYLVA, both citizens of the United States, residing at Los Angeles, in the county of Los Angeles, State of California, have invented certain new and useful Improvements in Joints, of which the following is a specification.

This invention relates to joints which are particularly adapted for table and other furniture constructions where a plurality of transversely-extending members are to be secured together.

The class of furniture to which it is especially applicable is that wherein the attached parts are metallic—for example, in operating-tables used in hospital service.

An object of this invention is to provide a joint for this and similar purposes which will have great strength and durability.

A further object of this invention is to provide a joint of this character which will present a good appearance and which will be free from exposed crevices, which not only mar the appearance, but which serve to accumulate dust and germs.

The usual practice in attaching metallic parts of this nature is to reduce or turn down the end of the smaller member, correspondingly bore the larger member from side to side, and pass the reduced part of the smaller member through said bore from side to side of the larger member, upsetting or riveting on the end, so as to clamp or grip the larger member between the upset and shoulder on the smaller member. This construction has the disadvantage of unduly weakening the smaller member and rendering it liable to break at the point where it enters the larger member and also of presenting crevices or notches between the shoulder of the smaller member and the wall of the larger member.

The present invention provides a construction which preserves the full diameter and strength of the smaller member where it enters the larger member and also avoids any crevices at such point of entrance.

The accompanying drawings illustrate the invention.

Figure 1 is an elevation of the members joined together. Fig. 2 is a transverse section on the line $X^2 X^2$ in Fig. 1, showing a joint of two transversely-extending members with the main member preferably perpendicular to both of them. Fig. 3 is a section on the line $X^3 X^3$ in Fig. 1, showing the joint of one member with the main member extending perpendicular thereto. Fig. 4 is a perspective of the joint end of one of the attached members.

1 designates the main or supporting member, which may, for example, be the leg of a table or similar article of furniture, such as an operating-table for hospital service. Said member 1 is tubular and its walls are bored to receive and engage the attached members 2, 3, and 4, which are of smaller diameter than the member 1. The members 2 and 3 are assumed to enter the member 1 perpendicular to one another and to the said member 1. The leg member 1 has diametrically opposite holes or bores 5 and 6, the hole 5 being of a size to receive and fit the body of member 2 and the hole 6 of a size to fit the stud, pin, or reduced end 7, projecting from or formed on the end of the member 2. The adjacent end of the member 2 abuts against the inner wall of the tubular member 1. The said member 1 is also provided with bores or openings 8 and 9, diametrically opposed to one another and in a line transverse or perpendicular to the axis of the member 2, and said member 2 is bored or perforated, as at 10, and counterbored or recessed, as at 11, in line with the centers of the perforations 8 and 9. The member 3 traverses and fits within the perforation 8 and enters and fits within the recess 11. A stud-pin or reduced end 12, projecting from and formed on the end of said member 3, traverses the perforation 10 and the hole 9, passing through to the outside of the member 1. The stud projections, pins, or reduced ends 7 and 12 are upset or riveted over at the outside of the member 1, the latter being preferably countersunk, so as to give a smooth and flush surface. When the parts are so arranged, each will interlock with the other and give a firm rigid fastening with a maximum of strength and with no exposed crevices.

In case only one transverse member is to be attached—for example, the member 4, (see Figs. 1 and 3)—it is secured in a manner similar to the member shown in Figs. 1 and 2, the tubular member 1 being bored at 13 and 14 with larger and small openings to receive and fit correspondingly the member 4 and the pin projection or reduced end 15 on the end thereof, the latter being riveted or upset into a countersink 17 to hold the shoulder 18 at the inner end of the member 4 tightly against the inner wall of the tubular member 1, giving a rigid connection.

What we claim is—

1. A tube, the shell of which has two diametrically opposite perforations, one perforation being larger than the other, a lateral member having a stud projecting from its end and forming a shoulder, the main portion of the lateral member projecting through the large perforation of the tube and closely fitting in the large perforation, opposite edges of the shoulder of the lateral member resting against the inside wall of the shell at points opposite the axis of the small perforation, the stud fitting closely in the small perforation and being headed to retain the lateral member in place.

2. The combination with a tubular member of two attached members of smaller diameter than the tubular member and arranged transversely to one another and to said tubular member, the said tubular member having openings receiving and fitting said smaller members and having small openings diametrically opposed to the aforesaid openings, said smaller members having reduced portions at their ends to fit in said smaller openings, one of said members having a transverse perforation to receive the reduced portion of the other member.

3. The combination with a tubular member of two attached members of smaller diameter than the tubular member and arranged transversely to one another and to said tubular member, the said tubular member having openings receiving and fitting said smaller members, and having small openings diametrically opposed to the aforesaid openings, said smaller members having reduced portions at their ends to fit in said smaller openings, one of said members having a transverse perforation to receive the reduced portion of the other member, and a recess to receive the end of the body of the other member.

In testimony whereof we have hereunto set our hands, at Los Angeles, California, this 1st day of February, 1905.

WILLIAM W. SWEENEY.
FRANK A. SYLVA.

In presence of—
GEORGE T. HACKLEY,
EARL A. R. LYNN.